US008255975B2

(12) United States Patent
Li et al.

(10) Patent No.: US 8,255,975 B2
(45) Date of Patent: Aug. 28, 2012

(54) METHOD AND APPARATUS FOR A COMMUNITY-BASED TRUST

(75) Inventors: Hong Li, El Dorado Hills, CA (US); Rita H. Wouhaybi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 11/850,542

(22) Filed: Sep. 5, 2007

(65) Prior Publication Data

US 2009/0064293 A1 Mar. 5, 2009

(51) Int. Cl.
*G06F 7/04* (2006.01)

(52) U.S. Cl. .............. 726/3; 726/2; 726/4; 726/5; 726/6

(58) Field of Classification Search ................... 726/2–6
See application file for complete search history.

(56) References Cited

U.S. PATENT DOCUMENTS

| | | | | |
|---|---|---|---|---|
| 7,155,738 | B2 * | 12/2006 | Zhu et al. | 726/4 |
| 2004/0187031 | A1 * | 9/2004 | Liddle | 713/201 |
| 2005/0256866 | A1 * | 11/2005 | Lu et al. | 707/5 |
| 2006/0212931 | A1 * | 9/2006 | Shull et al. | 726/10 |
| 2006/0294134 | A1 * | 12/2006 | Berkhim et al. | 707/102 |
| 2007/0011236 | A1 * | 1/2007 | Ravula | 709/204 |
| 2007/0136178 | A1 * | 6/2007 | Wiseman et al. | 705/37 |
| 2007/0203781 | A1 | 8/2007 | Kerschbaum et al. | |
| 2007/0208613 | A1 * | 9/2007 | Backer | 705/10 |
| 2007/0260520 | A1 * | 11/2007 | Jha et al. | 705/14 |
| 2008/0133747 | A1 * | 6/2008 | Fish | 709/224 |

FOREIGN PATENT DOCUMENTS

| | | |
|---|---|---|
| JP | 2003-132220 A | 5/2003 |
| JP | 2005-166007 A | 6/2005 |

OTHER PUBLICATIONS

Mezodi, Stephan, Communication pursuant to Article 94(3) EPC, Apr. 23, 2009, 2 pages, Application No. 08 252 569.2-2212, European Patent Office, Munich, Germany.

First Office Action for Chinese Patent Application No. 200810215883.2, Mailed Aug. 20, 2010, 12 pages.

Office Action received for Japanese Patent Application No. 2008-217466, mailed on May 31, 2011, 4 pages of Office Action and 4 pages of English Translation.

Second Office Action Received for CN Patent Application 200810215883.2 mailed Feb. 1, 2011; 6 pages including 3 pages of English Translation.

Office Action received for European Patent Application No. 08252569.2, mailed on Oct. 28, 2011, 6 pages.

* cited by examiner

*Primary Examiner* — Jason K. Gee
*Assistant Examiner* — Teshome Hailu
(74) *Attorney, Agent, or Firm* — Barnes & Thornburg LLP

(57) ABSTRACT

Machine-readable media, methods, apparatus and system for a community-based trust are provided. In an embodiment, it may be determined whether a requesting node obtains a trust from a targeting node through an endorsement from an intermediate node. If the requesting node obtains the trust through the endorsement from the intermediate node, an intermediate trust level that indicates how much the targeting node trusts the intermediate node may be obtained; and a new trust level that indicates how much the targeting node trusts the requesting node may be calculated based upon the intermediate trust level.

12 Claims, 4 Drawing Sheets

PROCESSOR
31
I/O DEVICE
34
CHIPSET
33
MEMORY
32
ANALYZING LOGIC
321
TRUST LIST
3210
TRUST LEVEL DETERMINING LOGIC
322
TRUST LEVEL UPDATING LOGIC
323
WEIGHT UPDATING LOGIC
325
WEIGHT DETERMINING LOGIC
324

METHOD AND APPARATUS FOR A COMMUNITY-BASED TRUST

BACKGROUND

Web of trust may be a mechanism for determining the validity of public keys, particularly for pretty good privacy (PGP) users. Users posting new public keys typically have a trusted intermediary sign the new key. Once the intermediary verifies the identity of the person with the new key, the signature then verifies that the new key is genuine.

Before signing, the intermediary makes certain that the key contains the correct key fingerprint (actual code). After signing, other users who trust the signer can decide to trust all the keys signed by that person.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE PREFERRED EMBODIMENTS

The following description describes techniques for a community-based trust. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
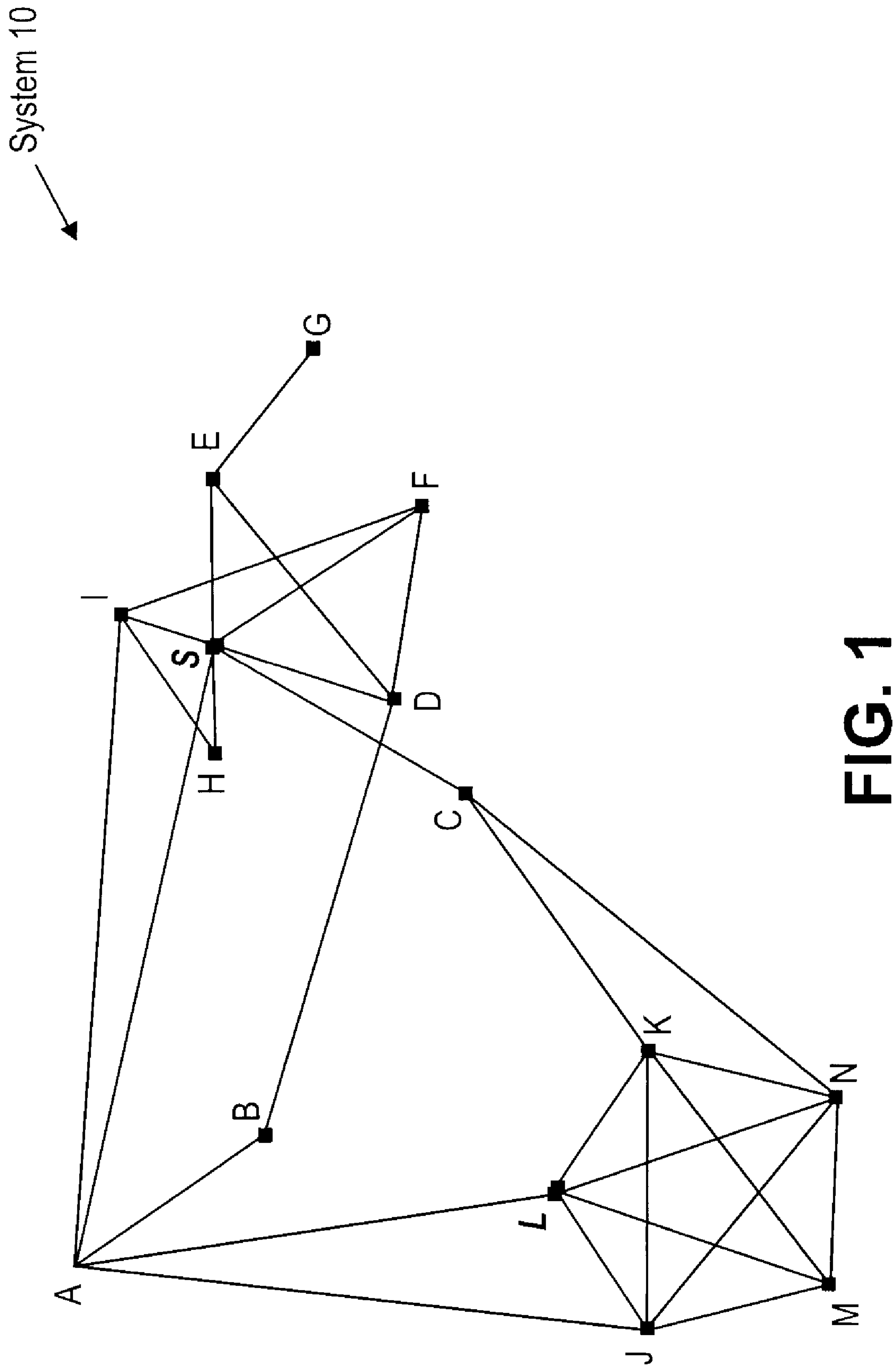
FIG. 1 illustrates an embodiment of a network adopting community-based trust mechanism.

FIG. 1 shows an embodiment of a network 10. Network 10 may adopt mechanism of community-based trust to build trust between two nodes within the network. Network 10 may comprise different types of clusters, for example, a cluster including node A and node B (individual trust cluster), a cluster including nodes H, I, S, E, G, D, F and C (random network cluster) and a cluster including nodes L, J, K, M and N (mesh network cluster). Each solid line in FIG. 1 indicates that trust has been established between the two connected nodes. Here, trust may include positive trust, negative trust (i.e., mistrust), and neutral (neither positive trust nor negative trust). Further, trust may be directional. If node A trusts node B, it does not necessarily mean that node B trusts node A.

According to the community-based trust, a requesting node (e.g., node F) may obtain trust from a targeting node (e.g., node A) via one or more trust routes. On a trust route, there may be one or more intermediate nodes, which have already established trust with the targeting node, to endorse the requesting node to the targeting node.

For example, node F may get trust from node A through an endorsement from node S or node I which has already established trust with node A, or through an endorsement from node D which, in turn, can obtain an endorsement from node B for node A. Trust endorsements from those intermediate nodes may also be referred to as "vouchers".

According to the community-based trust, from a node's perspective, other nodes that have established trust relationships with the node may not be treated equally. For example, node A may have a high degree of trust for node S, while trusting node I less, but may not trust node D at all. Trust levels may be given to each node that has established trust with node A to indicate how much node A trusts the other node.

Figure 2:
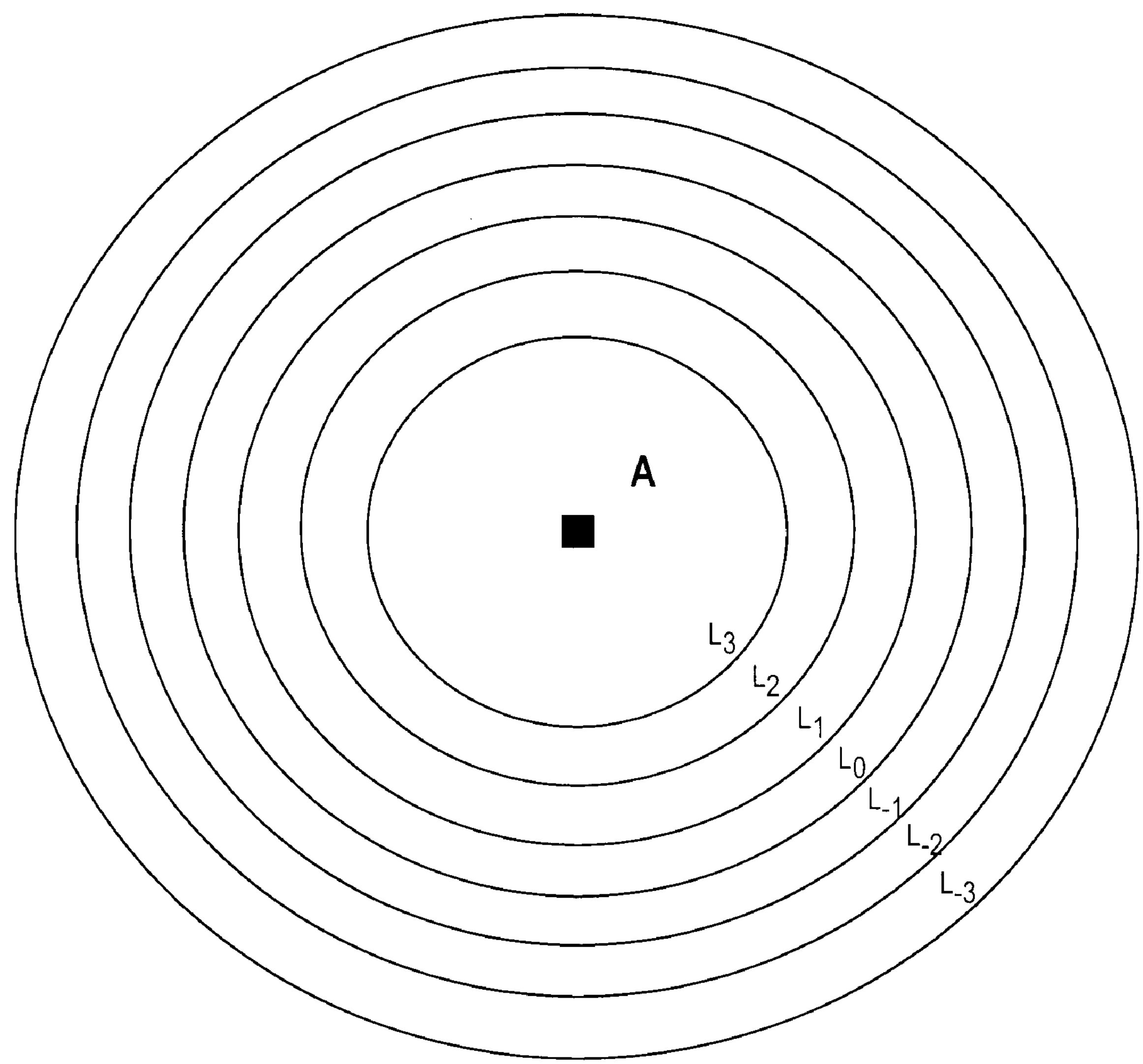
FIG. 2 illustrates an embodiment of trust level rings.

FIG. 2 illustrates an embodiment of trust level rings from a node's perspective, for example, from node A's perspective. As illustrated, node A may build the trust level rings around it representing its ranges of trust. Node A may place the nodes that it trusts the most in the first layer (ring $L_3$), and place its "friends" in the next layer (ring $L_2$), and so on. The middle layer (ring $L_0$) may denote a neutral state of neither trust nor mistrust. The outer layers (rings $L_1$ through $L_3$) may represent mistrust. The further a node is placed on the rings, the lower its trust level is.

Referring back to FIG. 1, according to the community-based trust, from a node's perspective, different vouchers may be given different weight for their endorsements to other nodes. In other words, weight may indicate how much the node trusts or values what the voucher says about other nodes. For example, both node S and node I endorse node F to node A, and node A may trust node S's endorsement more than node I's endorsement.

Figure 3:
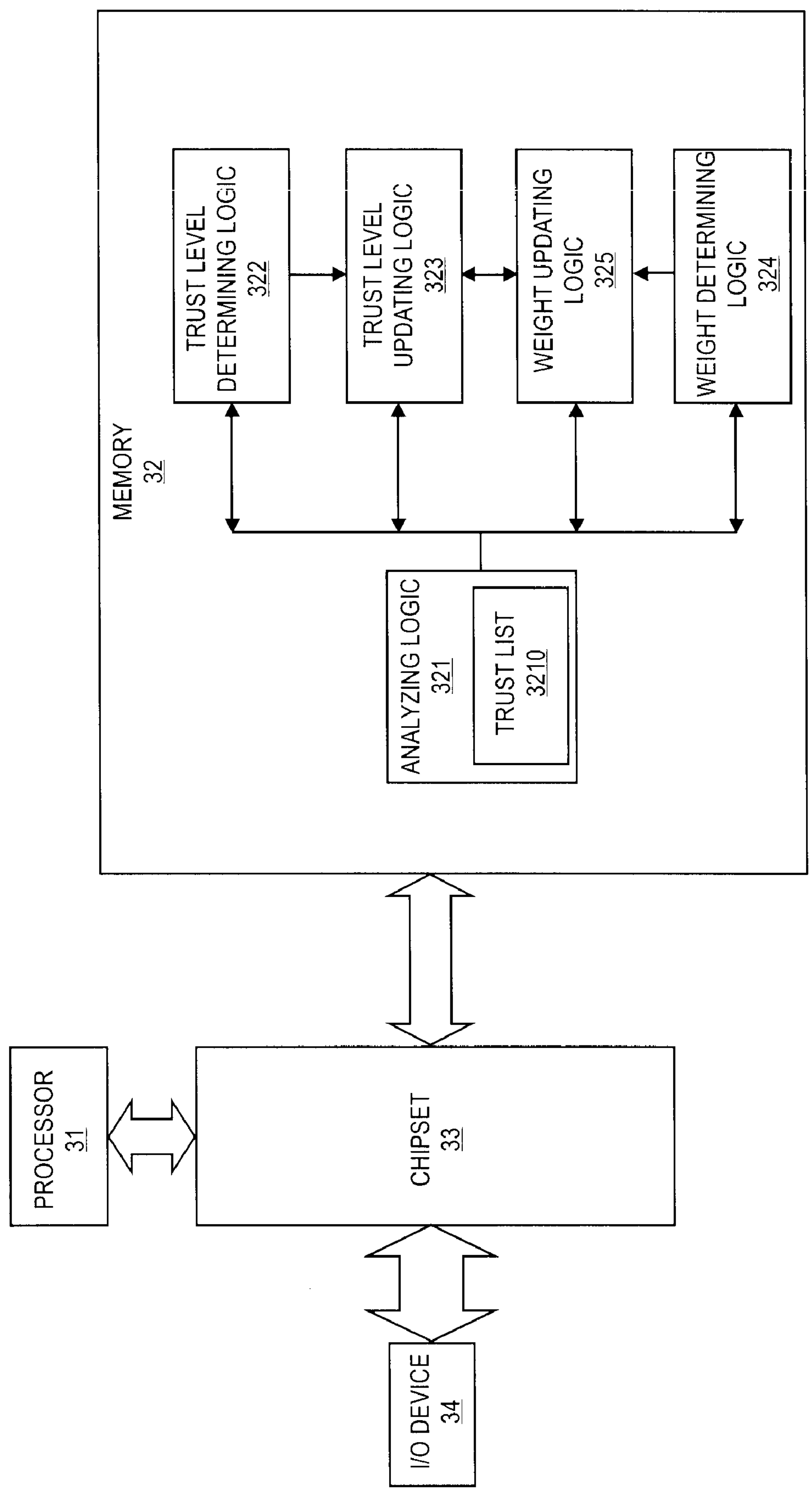
FIG. 3 illustrates an embodiment of a node within the network.

FIG. 3 illustrates an embodiment of a node (e.g., node A) within the network 10. Examples of the node may comprise mainframe computers, mini-computers, personal computers, workstations, portable computers, laptop computers, mobile phones or personal data assistants (PDA), or other device capable for data transceiving and processing.

The node may comprise one or more processors 31, memory 32, chipset 33, I/O devices 34 and possibly other components for data transceiving and processing.

Processors 31 are communicatively coupled to various components (e.g., the memory 32) via one or more buses such as a processor bus. Processors 31 may be implemented as an integrated circuit (IC) with one or more processing cores that may execute codes under a suitable architecture, for example, including Intel® Xeon™, Intel® Pentium™, Intel® Itanium™ architectures, available from Intel Corporation of Santa Clara, Calif.

Memory 32 may store codes to be executed by processor 31. In an embodiment, memory 32 may store analyzing logic 321, trust level determining logic 322, trust level updating logic 323, weight determining logic 324 and weight updating logic 325.

Analyzing logic 321 may analyze one or more trust routes for a requesting node (e.g., node F) to get trust from a targeting node (i.e., the node as shown in FIG. 3) (e.g., node A). For example, the analyzing logic 321 may analyze a trust route for node A on node F via trust reference on node S, trust route for node A on node F via trust reference on nodes B and D, and trust route for node A on node F via trust reference on node I.

Analyzing logic 321 may determine a set of first intermediate trust levels, each of which corresponds to an intermediate node (e.g., nodes S, B or I), which has established a trust relationship with the targeting node as well as a trust relationship with the requesting node. The first intermediate trust level may represent how much the targeting node trusts the intermediate node, e.g., how much node A trusts node S (or node B or node I).

Analyzing logic 321 may further determine a set of second intermediate trust levels, each of which corresponds to the intermediate node (e.g., nodes S, B or I). The second intermediate trust level may represent how much the intermediate node trusts the requesting node, e.g., how much node I (or node S or node B) trusts F.

Moreover, analyzing logic 321 may determine a set of intermediate weights, each of which corresponds to the intermediate node (e.g., nodes S, B or I). The intermediate weight may represent how much the targeting node trusts or values the endorsement from the intermediate node, e.g., how much node A believes the endorsement from the node S (or node B or node I).

Analyzing logic 321 may determine the trust levels and weights in various ways. For example, analyzing logic 321 may retrieve the trust levels and weights from a trust list 3210 maintained for the targeting node, which may record the trust levels and the weights associated to the nodes that have established trust relationships with the targeting node, as well as any updates of the trust levels and the weights. For the trust levels and weights not available from the trust list, analyzing logic 321 may send a request for the data on the network.

Trust level determining logic 322 may determine a new trust level for the requesting node based upon the set of first intermediate trust levels, the set of second intermediate trust levels, and the set of the intermediate weights. For example, the trust level determining logic 322 may determine the new trust level according to the following equation:

$$\tau_{ax} = \sum_{i=1}^{n} \alpha_{y_i} \tau_{ay_i} \tau_{y_i x}$$

wherein, $\tau_{ax}$ represents a new trust level between a targeting node (e.g., node a) and a requesting node (e.g., node x), namely, how much the targeting node trusts the requesting node; i is an integer between 1 and n that represents the number of trust routes for the requesting node to get trust from the targeting node; $\alpha_{y_i}$ represents an intermediate weight for an intermediate node (e.g., node $y_i$) on a trust route i, namely how much the targeting node believes an endorsement from the intermediate node; $\tau_{ay_i}$ represents an intermediate trust level between the targeting node and the intermediate node, namely, how much the targeting node trusts the intermediate node; $\tau_{y_i x}$ represents the intermediate trust level between the intermediate node and the requesting node, namely, how much the intermediate node trusts the requesting node.

As stated above, "trust" may comprise positive trust, negative trust or neutral. Therefore, value of the trust level may reflect whether the trust is positive, negative, or neutral. For example, a positive value may represent a positive trust, zero may represent neutral, and a negative value may represent a negative trust. From the above equation, it can be seen that a negative endorsement may weaken the level of trust that the requesting node may receive from the targeting node.

Trust level updating logic 323 may determine whether an event that may trigger the targeting node to update a trust level associated with a node that has established trust relationship with the targeting node occurs, and may update the trust level if the event occurs. The trust level may be the above-stated intermediate trust level, the new trust level, or any other trust levels as shown in FIG. 2.

Various events may trigger the update of the trust level. For example, the trust level may be updated if one or more vouchers provide positive or negative comments about the associated node, or if a positive or negative feedback from an application monitoring the activities of the associated node is received. The trust level may also be updated if a timer (not shown in FIG. 3) indicates that a predetermined period of time during which the trust level may remain in force expires. The trust level may be changed through increasing or decreasing its value.

Weight determining logic 324 may determine a weight for an endorsement from the requesting node, in which the weight may indicate how much the targeting node believes the endorsement of the requesting node. In one embodiment, the weight may be determined based upon the corresponding trust level. Namely, if the trust level indicates that the targeting node trusts the requesting node at a high degree, the weight determining logic 324 may assign a heavy weight to the requesting node which may indicate that the targeting node has a high degree of trust in the endorsement from the requesting node. However, if the trust level indicates that the targeting node mistrusts the requesting node, the weight determining logic 324 may assign a small or even zero weight to the requesting node, which may indicate that the targeting node does not trust the endorsement from the requesting node.

In another embodiment, the weight determining logic 324 may determine the weight not only depending on the trust level, but also depending on the purpose of the endorsement, social status of the requesting node, and the like. For example, a super node, a community leader, or a teacher of a network of students may carry more weight. The super node of a cluster (e.g., a random cluster) may be the node with the most connections or the node with the highest number of trust references established with other nodes on the same cluster or a selected authority for trust references.

Weight updating logic 325 may determine if an event that may trigger the targeting node to update a weight of a node that has established a trust relationship with the targeting node occurs, and may update the weight if the event occurs. Various types of events may trigger the update of the weight, for example, updating the associated trust level, changing the purpose of the endorsement, or changing the social status of the node.

Chipset 33 may provide one or more communicative path among processors 31, memory 32, I/O devices 34, and possibly other components. I/O devices 34 may input or output data to or from the targeting node, such as trust levels and weights. Examples for the I/O devices 34 may comprise a network card, a blue-tooth device, an antenna, and possibly other devices for transceiving data.

Other embodiments may implement other technologies for the structure of the node as shown in FIG. 3. For example, the targeting node may determine the new trust level based upon the intermediate trust levels, but not based upon the intermediate weights. In another example, the targeting node may determine the new trust level based upon the first intermediate trust level between the targeting node and the intermediate node, but not based upon the second intermediate trust level between the intermediate node and the requesting node.

Figure 4:
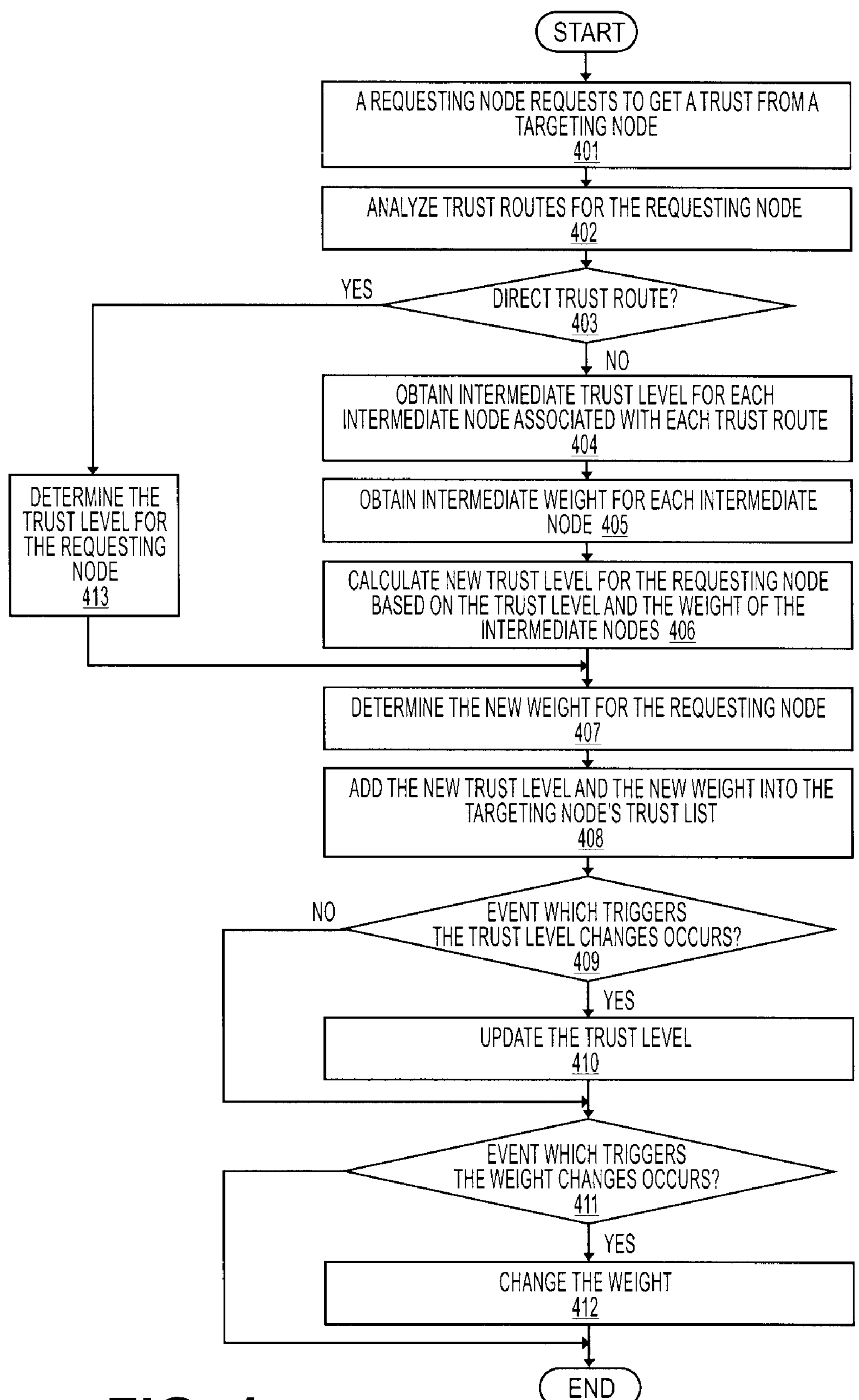
FIG. 4 illustrates an embodiment of a method of building a trust between two nodes within the network.

FIG. 4 illustrates an embodiment of a method of building a trust between two nodes (e.g., node A and node F) within the network 10. In block 401, a requesting node (e.g., node F) may request a trust from a targeting node (e.g., node A). In block 402, the targeting node may analyze one or more trust routes for the requesting code to get the trust from the targeting node, for example, trust from A to F through S, trust from A to F through I, and trust from A to F through B and D.

In block 403, the targeting node may determine whether the trust route is a direct trust route. Such a scenario may occur for a node that is newly added into the network 10 and has not established a trust relationship with any existing nodes in the network 10, in which case, the targeting node may establish a direct trust relationship with the targeting node via a direct trust route.

If the trust route is a direct trust route, the targeting node may determine the trust level for the requesting node based upon various factors, such as reputation of the requesting node, social status of the requesting node, purpose of the trust.

If the trust route is an indirect trust route, namely, that the requesting node receives trust from the targeting node through an endorsement from an intermediate node, then in block 404, the targeting node may obtain intermediate trust levels for the intermediate node (e.g., nodes I, S or B), e.g., the intermediate trust level between the targeting node and the intermediate node and the intermediate trust level between the intermediate node and the requesting node.

The targeting node may obtain the trust levels via trust lists respectively maintained for the targeting node and the intermediate node. In block 405, the targeting node may obtain an intermediate weight for the intermediate node. If there are more than one indirect trust routes, the targeting node may obtain the intermediate trust levels and weight for each intermediate node on each trust route.

In block 406, the targeting node may calculate a new trust level for the requesting node based upon the intermediate trust levels and the weights of the intermediate node(s). In block 407, the targeting node may determine a new weight for the requesting node, and in block 408, the targeting node may add the new trust level and the new weight to the targeting node's trust list. In block 409, the targeting node may determine whether an event occurs that may trigger an update of a trust level associated with a node that has established a trust relationship with the targeting node.

In response to the event, the targeting node may update the trust level for the affected node(s) and record the update in its trust list in block 410. Then, in block 411, the targeting node may determine whether an event occurs that may trigger to update a weight associated with a node that has established a trust relationship with the targeting node. In response to the event, the targeting node may update the weight for the affected node(s) and record the update in its trust list in block 412.

Although the current invention has been described in conjunction with certain embodiments, it shall be understood that modifications and variations may be resorted to without departing from the spirit and scope of the invention as those skilled in the art readily understand. Such modifications and variations are considered to be within the scope of the invention and the appended claims.

What is claimed is:

1. A non-transitory computer readable storage medium comprising a plurality of instructions that in response to being executed result in a system to perform operations comprising:

receiving, on a targeting node, a trust request from a requesting node;

analyzing, on the targeting node, at least one trust route between the requesting node and the targeting node to determine whether the requesting node requires an endorsement from an intermediate node to obtain the requested trust; and in response to the requesting node requiring the endorsement from the intermediate node, performing the following:

obtaining, on the targeting node, a first intermediate trust level that indicates how much the targeting node trusts the intermediate node, the first intermediate trust being one of: (i) a positive value of a range of positive values to indicate a positive level of trust, (ii) a negative value of a range of negative values to indicate a negative level of trust; and (iii) a zero value to indicate a neutral level of trust;

obtaining, on the targeting node, a second intermediate trust level that indicates how much the intermediate node trusts the requesting node, the second intermediate trust being one of: (i) a positive value of the range of positive values to indicate a positive level of trust, (ii) a negative value of the range of negative values to indicate a negative level of trust; and (iii) a zero value to indicate a neutral level of trust;

obtaining, on the targeting node, an intermediate weight associated with the intermediate node that indicates how much the targeting node trusts the current endorsement from the intermediate node, the intermediate weight being a function of whether the intermediate node is a super node; and calculating, on the targeting node, a new trust level at least partially based upon a product of the first intermediate trust level, the second intermediate trust level and the intermediate weight, wherein the new trust level indicates how much the targeting node trusts the requesting node;

setting a timer on the targeting node to a predetermined period of time during which the calculated new trust level remains in force; and in response to expiration of the timer, updating the trust level on the targeting node by obtaining a new first intermediate trust level, a new second intermediate trust level, obtaining a new intermediate weight, and calculating the updated trust level as a function of the product of the new first intermediate trust level, the new second intermediate trust level, and the new intermediate weight.

2. The non-transitory computer readable storage medium of claim 1, wherein, the intermediate weight is determined based upon a factor selected from a group comprising purpose of the endorsement and social status of the intermediate node.

3. The non-transitory computer readable storage medium of claim 1, wherein the plurality of instructions further result in the system to perform the operations comprising: if the requesting node obtains the trust from the targeting node without the endorsement from the intermediate node, then determining the new trust level based upon a factor selected from a group comprising reputation of the requesting node, social status of the requesting node and purpose of the trust, but not based on the intermediate weight.

4. The non-transitory computer readable storage medium of claim 1, wherein the plurality of instructions further result in the system to perform the operations comprising:

detecting whether an event occurs that triggers to update the new trust level, wherein the event is selected from a group comprising whether a comment about the requesting node is received from other nodes; and, whether a feedback about the requesting node is received from an application which monitors activities of the requesting node; and updating the new trust level if the event occurs.

5. A method executable by a computer processor of a targeting node of a system, the method comprising:

receiving, on the targeting node, a trust request from a requesting node;

analyzing, on the targeting node, at least one trust route between the requesting node and the targeting node to determine whether the requesting node requires an endorsement from an intermediate node to obtain the requested trust; and in response to the requesting node requiring the endorsement from the intermediate node, performing the following:

obtaining, on the targeting node, a first intermediate trust level that indicates how much the targeting node trusts the intermediate node, the first intermediate trust being one of: (i) a positive value of a range of positive values to indicate a positive level of trust, (ii) a negative value of a range of negative values to indicate a negative level of trust; and (iii) a zero value to indicate a neutral level of trust;

obtaining, on the targeting node, a second intermediate trust level that indicates how much the intermediate node trusts the requesting node, the second intermediate trust being one of: (i) a positive value of the range of positive values to indicate a positive level of trust, (ii) a negative value of the range of negative values to indicate a negative level of trust; and (iii) a zero value to indicate a neutral level of trust;

obtaining, on the targeting node, an intermediate weight associated with the intermediate node that indicates how much the targeting node trusts the current endorsement from the intermediate node, the intermediate weight being a function of whether the intermediate node is a super node;

calculating, on the targeting node, a new trust level at least partially based upon a product of the first intermediate trust level, the second intermediate trust level and the intermediate weight, wherein the new trust level indicates how much the targeting node trusts the requesting node;

setting a timer on the targeting node to a predetermined period of time during which the calculated new trust level remains in force; and in response to expiration of the timer, updating the trust level on the targeting node by obtaining a new first intermediate trust level, a new second intermediate trust level, obtaining a new intermediate weight, and calculating the updated trust level as a function of the product of the new first intermediate trust level, the new second intermediate trust level, and the new intermediate weight.

6. The method of claim 5, wherein, the intermediate weight is determined based upon a factor selected from a group comprising purpose of the endorsement and social status of the intermediate node.

7. The method of claim 5, wherein if the requesting node obtains the trust from the targeting node without the endorsement from the intermediate node, then determining the new trust level based upon a factor selected from a group comprising reputation of the requesting node, social status of the requesting node and purpose of the trust, but not based on the intermediate weight.

8. The method of claim 5, further comprising:

detecting, on the targeting node, whether an event occurs that triggers to update the new trust level, wherein the event is selected from a group comprising whether a comment about the requesting node is received from other nodes; and, whether a feedback about the requesting node is received from an application which monitors activities of the requesting node; and updating the new trust level if the event occurs.

9. A targeting node of a system, the targeting node comprising:

a computer processor; and a memory having a plurality of instructions stored therein that, in response to being executed by the computer processor, result in the computer processor:

receiving, on the targeting node, a trust request from a requesting node;

analyzing, on the targeting node, at least one trust route between the requesting node and the targeting node to determine whether the requesting node requires an endorsement from an intermediate node to obtain the requested trust; and in response to the requesting node requiring the endorsement from the intermediate node, performing the following:

obtaining, on the targeting node, a first intermediate trust level that indicates how much the targeting node trusts the intermediate node, the first intermediate trust being one of: (i) a positive value of a range of positive values to indicate a positive level of trust, (ii) a negative value of a range of negative values to indicate a negative level of trust; and (iii) a zero value to indicate a neutral level of trust;

obtaining, on the targeting node, a second intermediate trust level that indicates how much the intermediate node trusts the requesting node, the second intermediate trust being one of: (i) a positive value of the range of positive values to indicate a positive level of trust, (ii) a negative value of the range of negative values to indicate a negative level of trust; and (iii) a zero value to indicate a neutral level of trust;

obtaining, on the targeting node, an intermediate weight associated with the intermediate node that indicates how much the targeting node trusts the current endorsement from the intermediate node, the intermediate weight being a function of whether the intermediate node is a super node;

calculating, on the targeting node, a new trust level at least partially based upon a product of the first intermediate trust level, the second intermediate trust level and the intermediate weight, wherein the new trust level indicates how much the targeting node trusts the requesting node;

setting a timer on the targeting node to a predetermined period of time during which the calculated new trust level remains in force; and in response to expiration of the timer, updating the trust level on the targeting node by obtaining a new first intermediate trust level, a new second intermediate trust level, obtaining a new intermediate weight, and calculating the updated trust level as a function of the product of the new first intermediate trust level, the new second intermediate trust level, and the new intermediate weight.

10. The targeting node of claim 9, wherein, the intermediate weight is determined based upon a factor selected from a group comprising purpose of the endorsement and social status of the intermediate node.

11. The targeting node of claim 9, wherein if the requesting node obtains the trust from the targeting node without the endorsement from the intermediate node, then the plurality of instructions result in the computer processor determining the new trust level based upon a factor selected from a group comprising reputation of the requesting node, social status of the requesting node and purpose of the trust, but not based on the intermediate weight.

12. The targeting node of claim 9, wherein the plurality of instructions further result in the computer processor:

detecting, on the targeting node, whether an event occurs that triggers to update the new trust level, wherein the event is selected from a group comprising whether a comment about the requesting node is received from other nodes; and, whether a feedback about the requesting node is received from an application which monitors activities of the requesting node; and updating the new trust level if the event occurs.

* * * * *